US012747984B2

(12) United States Patent
Namazi et al.

(10) Patent No.: US 12,747,984 B2
(45) Date of Patent: Sep. 29, 2026

(54) SYSTEM AND METHOD FOR DETECTING CORRELATIONS BETWEEN TWO PHOTONS

(71) Applicant: Qunnect, Inc., Brooklyn, NY (US)

(72) Inventors: Mehdi Namazi, Brooklyn, NY (US); Alexander Craddock, Brooklyn, NY (US); Mael Flament, Brooklyn, NY (US); Rourke Sekelsky, Brooklyn, NY (US); Yang Wang, New York, NY (US); Felipe Giraldo Mejia, New York, NY (US)

(73) Assignee: Qunnect, Inc., Brooklyn, NY (US)

( * ) Notice: Subject to any disclaimer, the term of this patent is extended or adjusted under 35 U.S.C. 154(b) by 0 days.

(21) Appl. No.: 19/155,438

(22) PCT Filed: Feb. 12, 2024

(86) PCT No.: PCT/US2024/015448
§ 371 (c)(1),
(2) Date: Aug. 11, 2025

(87) PCT Pub. No.: WO2024/210996
PCT Pub. Date: Oct. 10, 2024

(65) Prior Publication Data
US 2026/0118170 A1 Apr. 30, 2026

Related U.S. Application Data

(60) Provisional application No. 63/484,696, filed on Feb. 13, 2023.

(51) Int. Cl.
*G01J 1/44* (2006.01)

(52) U.S. Cl.
CPC .......... *G01J 1/44* (2013.01); *G01J 2001/442* (2013.01)

(58) Field of Classification Search
CPC ........ G01J 1/44; G01J 2001/442; H04B 10/70
See application file for complete search history.

(56) References Cited

U.S. PATENT DOCUMENTS

2003/0086138 A1* 5/2003 Pittman .................. H04B 10/70
359/108
2022/0085985 A1 3/2022 Kaplan
(Continued)

OTHER PUBLICATIONS

International Search Report and Written Opinion dated Nov. 8, 2024, in connection with International Application No. PCT/US2024/015448.

(Continued)

*Primary Examiner* — Kevin K Pyo
(74) *Attorney, Agent, or Firm* — Wolf, Greenfield & Sacks, P.C.

(57) ABSTRACT

Techniques for reducing the number of detectors required to perform the measurements associated with quantum entanglement and quantum communication using optical qubits are described herein. The techniques comprise using delay lines between beam splitting optical elements to delay the arrival of photons at a detector such that a shared detector can be used to detect multiple photons for a correlation measurement with the detections occurring at different times. Thereby reducing the hardware requirements for the detectors by half and substantially reducing the cost and complexity of systems to detect and process qubits.

20 Claims, 5 Drawing Sheets

(56) References Cited

U.S. PATENT DOCUMENTS

| | | | | |
|---|---|---|---|---|
| 2022/0416906 | A1 | 12/2022 | Solmeyer et al. | |
| 2024/0129045 | A1* | 4/2024 | Namazi | G02F 1/211 |

OTHER PUBLICATIONS

International Preliminary Report on Patentability dated Aug. 28, 2025, in connection with International Application No. PCT/US2024/015448.

Megidish, et al. A Resource Efficient Source of Multi-photon Polarization Entanglement. arXiv:1204.1997v1. Apr. 9, 2012. 5 pages. DOI: 10.48550/arXiv1204.1997>.

* cited by examiner

SYSTEM AND METHOD FOR DETECTING CORRELATIONS BETWEEN TWO PHOTONS

CROSS REFERENCE TO RELATED APPLICATIONS

This application is a national stage filing under 35 U.S.C. § 371 of international PCT application PCT/US2024/015448, filed Feb. 12, 2024, and entitled "A SYSTEM AND METHOD FOR DETECTING CORRELATIONS BETWEEN TWO PHOTONS," which claims the benefit of priority under 35 U.S.C. § 119 (e) to U.S. Provisional Patent Application Ser. No. "63/484,696", filed on Feb. 13, 2023, and entitled "METHOD FOR REDUCING THE NUMBER OF SINGLE PHOTON DETECTORS USED TO PERFORM ENTANGLED AND NON-ENTANGLED QUANTUM MEASUREMENT PROTOCOLS," each of which is incorporated by reference herein in its entirety.

BACKGROUND

Quantum networks facilitate the transmission of information in the form of quantum bits ("qubits") between physically separated quantum processors or other quantum devices (e.g., quantum sensors). Quantum networks may be used to enable optical quantum communication over distances and can be implemented over standard telecommunication optical fibers through the transmission of single photons onto which information is encoded (e.g., in polarization). To enable the reliable transmission of quantum information over any distance, additional components may be needed.

SUMMARY

The following is a non-limiting summary of some embodiments of the present application. Some embodiments provide for a system for detecting correlations between two photons, the system comprising: a non-polarizing beam splitter configured to receive a first photon from a first entanglement source at a first input of the non-polarizing beam splitter and to receive a second photon from a second entanglement source at a second input of the non-polarizing beam splitter; a polarizing beam splitter configured to receive a first output of the non-polarizing beam splitter at a first input of the polarizing beam splitter, the polarizing beam splitter configured to direct light having a first polarization to a first output of the polarizing beam splitter and to direct light having a second polarization to a second output of the polarizing beam splitter; a delay line configured to receive a second output of the non-polarizing beam splitter and to output light to the second input of the polarizing beam splitter; a first photon detector configured to receive the output corresponding to the first polarization; and a second photon detector configured to receive the output corresponding to the second polarization.

In some embodiments, the delay line has a length corresponding to a time delay greater than or equal to a temporal bandwidth of the first and second photon or a jitter of a detector.

In some embodiments, the delay line provides a delay between 20 and 40 ns.

In some embodiments, the delay line is a fiber optic cable.

In some embodiments, the non-polarizing beam splitter is a non-polarizing beam splitter cube.

In some embodiments, the polarizing beam splitter is a Glan-Taylor prism polarizer.

In some embodiments, the first detector and the second detector are a same kind of detector.

In some embodiments, the same kind of detector is a superconducting nanowire single photon detector.

In some embodiments, the first photon detector and the second photon detector are configured to detect four bell parameters, based on four polarization measurements, a first two polarization measurements being detected based on the first output of the non-polarizing beam splitter and a second two polarization measurements being detected based on the second output of the non-polarizing beam splitter.

In some embodiments, additional detectors, with a respective nonpolarizing beamsplitter, delay line, and polarizing beamsplitter, the additional detectors being configured to detect correlations between a third photon from a third entanglement source and a fourth photon from a fourth entanglement source.

Some embodiments provide for a system for detecting correlations between two photons, the system comprising: a non-polarizing beam splitter configured to receive a first photon from a first entanglement source at a first input of the non-polarizing beam splitter and to receive a second photon from a second entanglement source at a second input of the non-polarizing beam splitter, a polarizing beam splitter having a first input and a second input, the polarizing beam splitter configured to receive a first output of the non-polarizing beam splitter at the first input of the polarizing beam splitter, the polarizing beam splitter configured to direct light having a first polarization to a first output of the polarizing beam splitter and to direct light having a second polarization to a second output of the polarizing beam splitter; a first delay line configured to receive a second output of the non-polarizing beam splitter and to output light to the second input of the polarizing beam splitter; a second delay line configured to receive the second output of the polarizing beam splitter having the second polarization and to output light into a shared beam path, the shared beam path configured to receive the first output of the polarizing beam splitter and an output of the second delay line; and a photon detector configured to receive photons at different times depending on their path between the non-polarizing beam splitter and the photon detector.

In some embodiments, the first delay line has a longer optical pathlength than the second delay line.

In some embodiments, the second delay line has an optical pathlength approximately equal to a temporal bandwidth of the first and second photon and the first delay line has an optical pathlength approximately equal to twice the temporal bandwidth of the first and the second photon.

In some embodiments, the first photon detector is a superconducting nanowire single photon detector.

In some embodiments, the first photon detector is configured to detect four bell parameters, based on four polarization measurements, the four polarization measurements comprising: a first polarization measurements being detected based on the first output of the non-polarizing beam splitter; a second polarization measurement being detected based on the first output of the non-polarizing beam splitter and the second delay line; a third polarization measurement being detected based on the second output of the non-polarizing beam splitter and the first delay line; and a fourth polarization measurement being detected based on the second output of the non-polarizing beam splitter, the first delay line, and the second delay line.

Some embodiments provide for a method for detecting a quantum state based on detection of two photons, the method comprising: receiving a first photon, from a first beam path, and a second photon, from a second beam path; splitting the first beam path and the second beam path into a first shared beam path and a second shared beam path; splitting the first shared beam path, using a polarizing beam splitter, into a first polarized beam path and a second polarized beam path, the second polarized beam path having a polarization orthogonal to the first polarized beam path; delaying the second shared beam path; detecting first outputs corresponding to the first polarized beam path and the second polarized beam path; splitting the second shared beam path, using the polarizing beam splitter, into the first polarized beam path and the second polarized beam path; and detecting second outputs corresponding to the first polarized beam path and the second polarized beam path.

In some embodiments, delaying the second shared beam path comprising using a delay line that has a length corresponding to a time delay greater than or equal to a temporal bandwidth of the first and second photon or a jitter of a detector.

In some embodiments, the delay line provides a delay between 20 and 40 ns.

In some embodiments, detecting first outputs corresponding to the first polarized beam path comprises using a first detector and detecting first outputs corresponding to the second polarized beam path comprises using a second detector.

In some embodiments, detecting first outputs corresponding to the first polarized beam path comprises using a first detector and detecting first outputs corresponding to the second polarized beam path comprises delaying the second polarized beam path and using the first detector.

DETAILED DESCRIPTION

Figure 1:
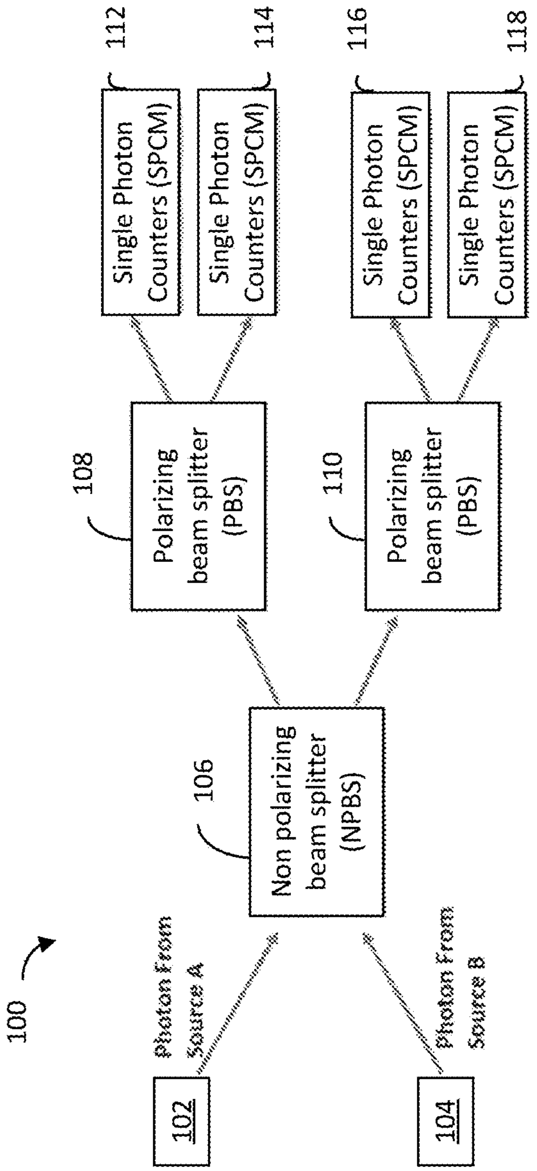
FIG. 1 illustrates a configuration 100 for entanglement swapping and Bell State measuring using passive optical elements.

The inventors have developed techniques to facilitate quantum information science by improving the efficiency of processing qubits.

Quantum information science will enable unprecedented information integration, processing, and distribution capabilities. Similar to the evolution of the classical internet, where current applications were unimaginable in the earliest demonstrations of networks, the "quantum internet" has the potential to enable revolutionary application such as unconditionally-secure secret key exchange, distributed quantum computation, enhanced quantum metrology, and tests of fundamental physics.

Improvements in quantum repeater technologies have enabled existing telecommunication fiber infrastructure to be adapted for quantum network processing through the use of optical qubits. However, the inventors have recognized and appreciated that the cost and complexity of the hardware required to detect and process optical qubits provides limitations on the adoption and implementation of quantum network technologies. In particular, the use of single photon detectors may become prohibitively expensive for a large-scale implementation. Single photon detectors are used in conventional techniques for measuring the entanglement between two qubits. For two qubits which each have two states (e.g., 0 and 1) the superposition of the qubits can be described using four basis states (e.g., Bell states). Determination of the basis state is a key operation in quantum communication. For optical qubits, the basis state can be determined by using four detectors to acquire four polarization measurements. From the four polarization measurements, the entanglement between the two qubits can be mapped to a basis state.

Thus, the inventors have developed techniques for reducing the number of detectors required to perform the measurements associated with quantum entanglement and quantum communication using optical qubits. The inventors have developed systems which can acquire the four polarization measurements used to determine the basis state using two detectors. Thereby reducing the hardware requirements for the detectors by half and substantially reducing the cost and complexity of systems to detect and process qubits.

Accordingly, some embodiments provide for a system that is configured for detecting correlations between two photons (e.g., entanglement swapping and/or Bell state measurements), the system comprising: a non-polarizing beam splitter (e.g., a non-polarizing beam splitter cube) configured to receive a first photon (e.g., a qubit) from a first entanglement source at a first input of the non-polarizing beam splitter (e.g., an input face of the non-polarizing beam splitter cube) and to receive a second photon (e.g., a second qubit) from a second entanglement source at a second input of the non-polarizing beam splitter (e.g., a second input face of the non-polarizing beam splitter cube, orthogonal to the first face); a polarizing beam splitter configured to receive a first output of the non-polarizing beam splitter (e.g., a first output face of the non-polarizing beam splitter cube); a polarizing beam splitter configured to receive a first output of the non-polarizing beam splitter at a first input of the polarizing beam splitter, the polarizing beam splitter configured to direct light having a first polarization to a first output of the polarizing beam splitter and to direct light having a second polarization to a second output of the polarizing beam splitter; a first photon detector configured to receive the output corresponding to a first polarization; a second photon detector configured to receive the output corresponding to the second polarization, and a delay line configured to receive a second output of the non-polarizing beam splitter and to output light to the second input of the polarizing beam splitter.

In some embodiments, the first photon detector and the second photon detector are configured to detect four Bell parameters, based on four polarization measurements, a first two polarization measurements being detected based on the first output of the non-polarizing beam splitter and a second two polarization measurements being detected based on the second output of the non-polarizing beam splitter.

In some embodiments, the system further includes additional detectors, with a respective nonpolarizing beamsplitter, delay line, and polarizing beamsplitter, the additional detectors being configured to detect correlations between a third photon, from a third entanglement source, and a fourth photon, from a fourth entanglement source.

Some embodiments provide for a system for detecting correlations between two photons, the system comprising: a non-polarizing beam splitter configured to receive a first photon from a first entanglement source at a first input of the non-polarizing beam splitter and to receive a second photon from a second entanglement source at a second input of the non-polarizing beam splitter; a polarizing beam splitter having a first input and a second input, the polarizing beam splitter configured to receive a first output of the non-polarizing beam splitter at the first input of the polarizing beam splitter, the polarizing beam splitter configured to direct light having a first polarization to a first output of the polarizing beam splitter and to direct light having a second polarization to a second output of the polarizing beam splitter; a first delay line configured to receive a second output of the non-polarizing beam splitter and to output light to the second input of the polarizing beam splitter; a second delay line configured to receive the second output of the polarizing beam splitter having the second polarization and to output the received second output into a shared beam path, the shared beam path configured to receive the first output of the polarizing beam splitter and an output of the second delay line; and a photon detector configured to receive photons at different times depending on their path between the non-polarizing beam splitter and the photon detector.

In some embodiments, the first photon detector is configured to detect four bell parameters, based on four polarization measurements, the four polarization measurements comprising: a first polarization measurements being detected based on the first output of the non-polarizing beam splitter; a second polarization measurement being detected based on the first output of the non-polarizing beam splitter and the second delay line; a third polarization measurement being detected based on the second output of the non-polarizing beam splitter and the first delay line; and a fourth polarization measurement being detected based on the second output of the non-polarizing beam splitter, the first delay line, and the second delay line.

Some embodiments provide for a method for detecting a quantum state based on detection of two photons, the method comprising: receiving a first photon, from a first beam path, and a second photon, from a second beam path; splitting the first photon beam path and the second photon beam path into a first shared beam path and a second shared beam path, splitting the first shared beam path, using a polarizing beam splitter, into a first polarized beam path and a second polarized beam path, the second polarized beam path having a polarization orthogonal to the first polarized beam path; delaying the second shared beam path; detecting outputs corresponding to the first polarized beam path and the second polarized beam path; splitting the second shared beam path, using the polarizing beam splitter, into the first polarized beam path and the second polarized beam path; and detecting second outputs corresponding to the first polarized beam path and the second polarized beam path.

Some embodiments provide for a method of determining a correlation between photons from two different entanglement sources, the method comprising: receiving photons from two entanglement sources, the received photons comprising a first photon from a first entanglement source and a second photon from a second entanglement source; delaying a portion of the receiving photons by a set delay period; detecting a first polarization measurement using a first single photon detector configured to detect photons having a first polarization; detecting a second polarization measurement using a second single photon detector configured to detect photons having a second polarization; detecting, after the set delay period, a third polarization measurement using the first single photon detector; detecting, after the set delay period, a fourth polarization measurement using the second single photon detector; and determining a correlation between the first photon and the second photon based on first polarization measurement, second polarization measurement, third polarization measurement, and fourth polarization measurement.

FIG. 1 illustrates a configuration 100 for entanglement swapping and Bell State measuring using passive optical elements. Configuration 100 can be used to swap entanglement between entanglement source A 102 and entanglement source B 104. As shown in FIG. 1—two photons, each from entanglement source 102 and 104 respectively, enter the first element non-polarizing beam splitter 106 simultaneously. The two photons will, with equal probability, leave from one of the two exit ports of the non-polarizing beam splitter 106. Each exit port then leads to a respective polarizing beam splitter 108 and 110, which then separates the photons into two paths based on the polarization. All four outputs of the two polarizing beam splitting elements are connected to individual photon counters 112, 114, 116, and 118.

Relative to the configuration illustrated in FIG. 1, the inventors have developed a configuration for providing the same performance as the configuration in FIG. 1 while significantly reducing the number of elements required for the measurement.

Figure 2:
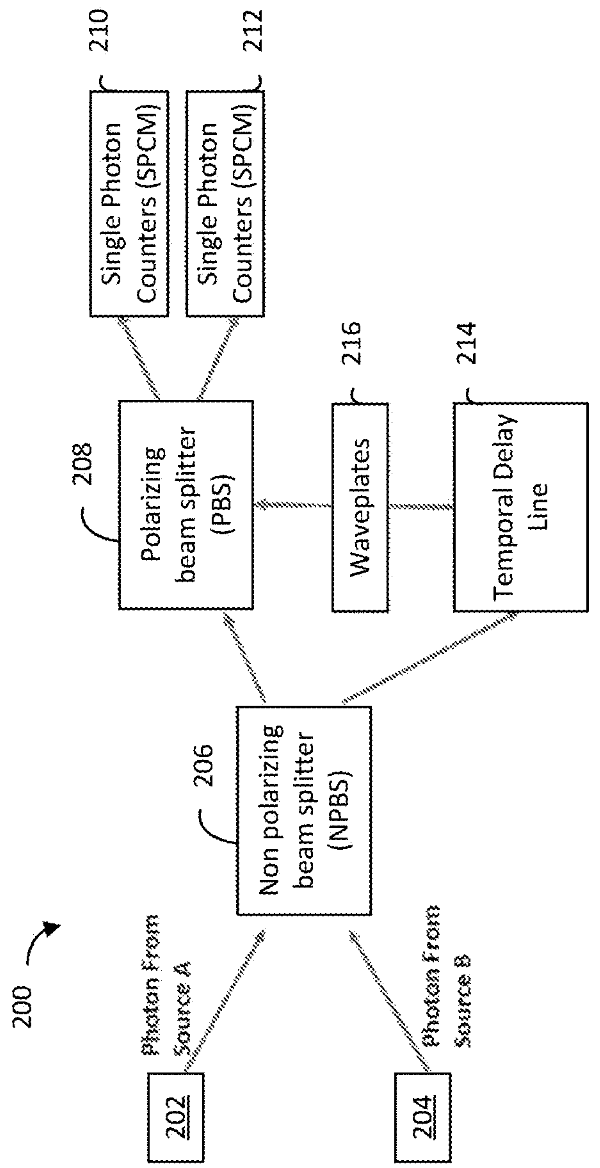
FIG. 2 illustrates a correlation detection configuration 200 for entanglement swapping and Bell State measuring, in accordance with some embodiments of the technology described herein.

FIG. 2 illustrates a correlation detection configuration 200 for entanglement swapping and Bell State measuring, in accordance with some embodiments of the technology described herein. Correlation detection configuration 200 includes non-polarizing beam splitter 206, polarizing beam splitter 208, temporal delay line 214, waveplates 216, and single photon counters 210 and 212.

As shown in FIG. 2, non-polarizing beamsplitter 206 receives a first photon from first entanglement source 202 and a second photon from second entanglement source 204. The received photons are probabilistically split (e.g., either reflected to a first output or transmitted to a second output) between the two outputs of the non-polarizing beamsplitter 206. The first output of non-polarizing beamsplitter 206 is configured to direct photons to polarizing beam splitter 208. Polarizing beamsplitter 208 directs photons based on their polarization to one of the two outputs of polarizing beamsplitter 208. For example, polarizing beamsplitter 208 may direct vertically polarized light to a first output of the polarizing beamsplitter 208 and may direct horizontally polarized light to a second output of the polarizing beamsplitter 208. To detect the photons corresponding to the respective polarizations, single photon counter 210 is configured to receive light from the first output of polarizing beamsplitter 208 and single photon counter 212 is configured to receive light from the second output of polarizing beamsplitter 208.

The second output of non-polarizing beamsplitter 206 is configured to direct photons to temporal delay line 214. Temporal delay line 214 outputs photons, received from the second output of non-polarizing beamsplitter 206, to polarizing beamsplitter 208. Additionally, temporal delay line 214 provides additional optical pathlength for the photons received from the second output of non-polarizing beamsplitter 206. Accordingly, the additional optical pathlength corresponds to a temporal delay between the arrival of the photons from the first output of non-polarizing beamsplitter 206 and the photons from the second output of non-polarizing beamsplitter 206 at polarizing beam splitter 208.

In some embodiments, polarizing beamsplitter 208 is a polarizing beam splitter cube. In some embodiments, polarizing beamsplitter 208 is a Glan-Taylor polarizer. In some embodiments, polarizing beamsplitter 208 is a Glan-Laser polarizer. In some embodiments, polarizing beam splitter 208 is a Glan-Thompson polarizer.

In some embodiments, waveplates 216 are included between the output of temporal delay line 214 and polarizing beam splitter 208. Waveplates 216 may be used to compensate for any polarization needed for the measurement station. In some embodiments, the waveplates may be configured to compensate for phase drift through the delay line. In some embodiments, the waveplates may be configured to remove the possibility of getting both early and late detection events on the same detector. For example, rotating the polarization of the light from the temporal delay line prior to transmitting through polarizing beam splitter 208 could result in the light being directed to an opposite output of polarizing beam splitter 208. Accordingly, for some quantum systems, such a rotation may significantly reduce the delay length needed for the module to avoid the deadtime of the detectors which are typically much longer than their jitter or photons temporal width.

Non-polarizing beamsplitter 206 may be a 50:50 beamsplitter (e.g., equal probability of a received photon being detected from either of the outputs). In some embodiments, the non-polarizing beam splitter 206 generates a superposition of the first photon and the second photon.

In some embodiments, the temporal delay line may be implemented in any suitable way such that a longer optical path is provided for the photon coming out of one of the output ports of the non-polarizing beam splitter cube compared to the other output port. In some embodiments, the minimum delay length of the temporal delay line is the distance light travels in the delay medium that corresponds with the dead time of the detectors and the detector jitter. In some embodiments, the minimum delay length of the temporal delay line is the distance light travels in the delay medium that corresponds with the temporal bandwidth of the qubits. In some embodiments, the minimum delay length of the temporal delay line is the distance light travels in the delay medium that corresponds with the jitter of the detector. In some embodiments, the minimum delay length of the temporal delay line is the distance light travels in the delay medium that corresponds with a combination of the detector deadtime, the temporal bandwidth of the qubit, and/or the jitter of the detector.

In some embodiments, correlation detection configuration 200 may be implemented as a fully fiber-based optical setup. In some embodiments, correlation configuration 200 may be implemented as a free space optical setup. For example, at telecom wavelengths, a low loss optical fiber (e.g., a fiber optic cable) may be used for the delay line. In some embodiments, correlation configuration 200 may be implemented as a hybrid optical setup, including both free-space and fiber based optical components. The use of fiber or free-space optical components may depend on the wavelength of the system. Any suitable wavelength of light may be used such that the light can be transmitted between system components with low loss, as aspects of the technology described herein are not limited in this respect.

The single photon counters may be any suitable single photon counter depending on the detection efficiency needed for a particular measurement or process. In some embodiments, the single photon counter is a photomultiplier tube detector. In some embodiments, the single photon counter is a single-photon avalanche photodiode. In some embodiments, the single photon counter is a superconducting nanowire single-photon detector. For quantum communication application requiring the highest detection efficiencies, superconducting nanowire single-photon detectors are used. However, in some embodiments, other single photon counters may be used, as aspects of the technology described herein are not limited in this respect.

Figure 3:
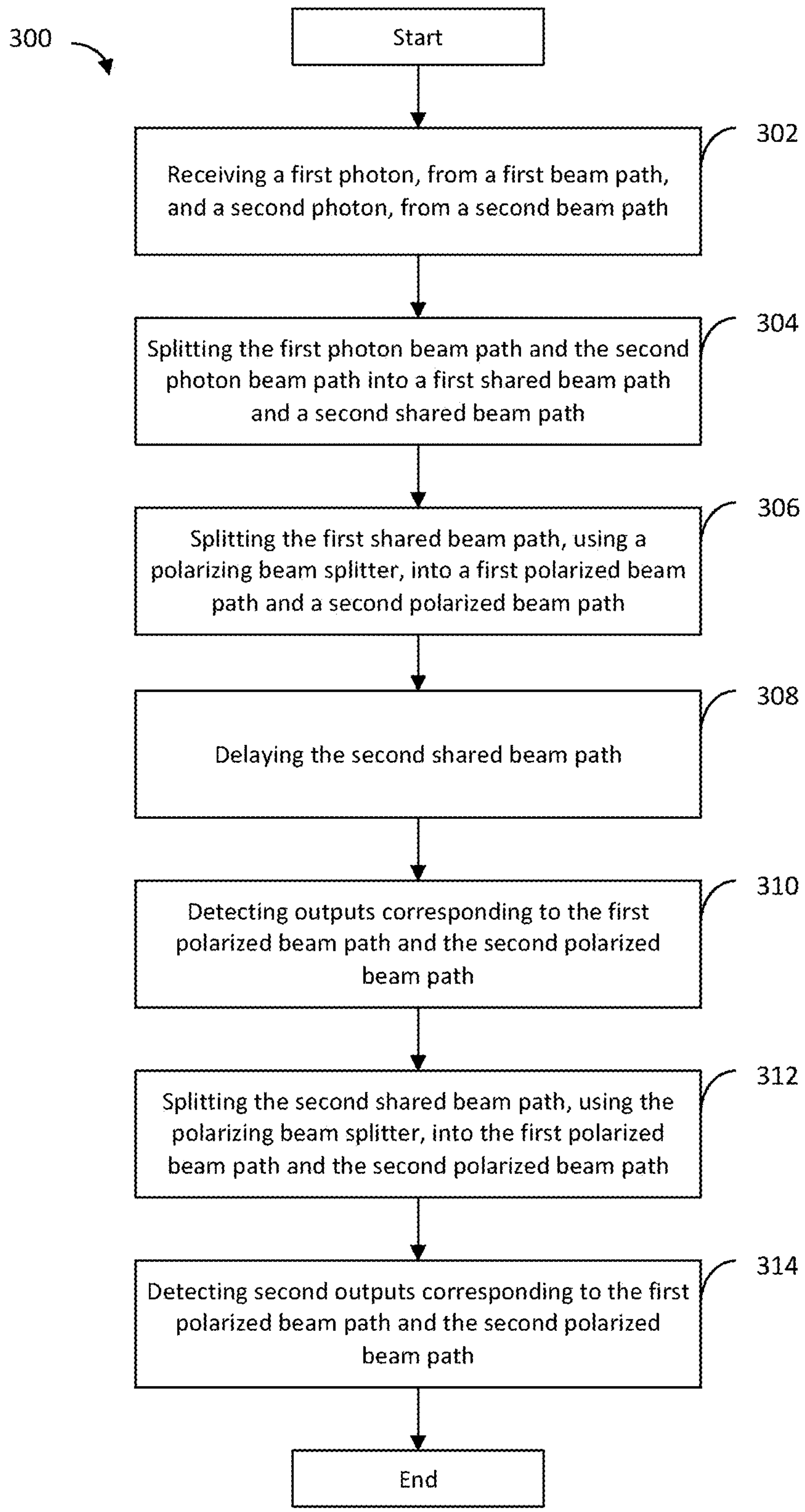
FIG. 3 illustrates a flowchart corresponding to a process 300 for detecting a quantum state based on detection of two photons, in accordance with some embodiments of the technology described herein.

FIG. 3 illustrates a flowchart corresponding to a process 300 for detecting a quantum state based on detection of two photons, in accordance with some embodiments of the technology described herein. The two photons are from two separate sources. In some embodiments, the two photons being a first photon from a first entanglement source and a second photon from a second entanglement source. Process 300 may be used with any suitable photon regardless of linewidth, wavelength, and other properties.

Process 300 begins at act 302 by receiving a first photon, from a first beam path, and receiving a second photon, from a second beam path, in accordance with some embodiments of the technology described herein. In some embodiments, the first photon is a first qubit from a first entanglement source, associated with the first beam path, and the second photon is a second qubit from a second entanglement source, associated with the second beam path.

The first photon and the second photon are received at a non-polarizing beamsplitter, in accordance with some embodiments of the technology described herein. The non-polarizing beamsplitter may be a non-polarizing beamsplitter cube. The first photon and the second photon are received at the non-polarizing beamsplitter cube at the same time. The first photon may be received at a first input side of the non-polarizing beamsplitter, and the second photon may be received at a second input side of the non-polarizing beamsplitter.

In some embodiments, the non-polarizing beamsplitter cube is configured such that a first photon from the first beam path and a second photon from the second beam path are mixed to create a superposition between the state of the first photon and the state of the second photon.

In some embodiments, the first beam path may be a fiber-based beam path. In some embodiments, the first beam path may be a free space beam path. In some embodiments, the first beam path may include a mixture of fiber and free space optical components.

Similarly, in some embodiments, the second beam path may be a fiber-based beam path. In some embodiments, the second beam path may be a free space beam path. In some embodiments, the second beam path may include a mixture of fiber and free space optical components.

In some embodiments, the first and second beam paths may use the same optical implementation (e.g., both use fiber optic components). In some embodiments, the first and second beam paths may use independent optical implementations (e.g., the first beam path may use fiber optic components and the second beam path may use free space optical components).

Next, process 300 continues to act 304 by splitting the first photon beam path and the second photon beam path into a first shared beam path and a second shared beam path, in accordance with some embodiments of the technology described herein. A beam splitter is used to split the first photon beam path and the second photon beam path into a first shared beam path and a second shared beam path. The non-polarizing beamsplitter, which receives the first photon and the second photon at respective inputs, probabilistically directs each photon cither to a first output, corresponding to the first shared beam path, or to a second output, corresponding to the second shared beam path. For example, the first photon and the second photon may both be directed to the first output. As another example, the first photon and the second photon may both be directed to the second output. As a third example, the first photon may be directed to the first output and the second photon may be directed to the second output. As a fourth example, the first photon may be directed to the second output and the second photon may be directed to the first output. In some embodiments, the non-polarizing beamsplitter is a 50:50 beamsplitter, as described herein.

Next, process 300 continues to act 306 by splitting the first shared beam path, using a polarizing beam splitter, into a first polarized beam path and a second polarized beam path, in accordance with some embodiments of the technology described herein. The polarizing beam splitter directs light to one of two outputs depending on the polarization of the light. Light having a first polarization will be directed to a first output while light having a second polarization will be directed to a second output, the second polarization being orthogonal to the first polarization. Accordingly, the output from the polarizing beam cube is two optical beam paths having orthogonal polarizations. For example, the first output may be horizontally polarized, and the second output may be vertically polarized, where the horizontal and vertical directions are relative to a reference axis of the polarizer.

Next, process 300 continues to act 308 by delaying the second shared beam path, in accordance with some embodiments of the technology described herein. A delay line is used to delay light received by the second shared beam path, the delay being an increased pathlength that light received by the second shared beam path traverses, relative to pathlength of the first shared beam path. In some embodiments, the delay line is an optical fiber. For example, a length of optical fiber that is configured to add length to the second shared beam path. The added length corresponds to a delay time. In some embodiments, the delay line includes free space optics.

In some embodiments, the delay time is the duration of the received photon temporal bandwidth (e.g., the duration of a light pulse in the time domain). In some embodiments, the delay time is the jitter amount of the detector. In some embodiments, the delay time is the longer of the received photon temporal bandwidth and the jitter amount of the detector. In some embodiments, the delay time is a dead time of the detector. In some embodiments, the delay time is a combination of one or more of the temporal bandwidth, jitter amount of the detector, and the deadtime of the detector.

In some embodiments, the delay time is between 20 picoseconds (ps) and 40 ps, between 10 ps and 100 ps, between 1 ps and 500 ps, between 1 ps and 1 ns, between 500 ps and 40 ns, between 1 ns and 100 ns, or between 10 and 500 ns.

Next, process 300 continues to act 310 by detecting outputs corresponding to the first polarized beam path and the second polarized beam path, in accordance with some embodiments of the technology described herein. In some embodiments, a single detector is used to detect the output corresponding to the first polarized beam path and the output corresponding to the second polarized beam path. In some embodiments, two detectors may be used to detect the output corresponding to the first polarized beam path and the output corresponding to the second polarized beam path. Detecting the output corresponding to the first polarized beam path detects a first polarization measurement. Similarly, detecting the output corresponding to the second polarized beam path detects a second polarization measurement. In some instances, the measurement may be that no photons are detected. In some instances, the measurement may be that one photon is detected. In some embodiments, the measurement may be limited to single photon detection. In some embodiments, the measurement may detect zero, one, or more photons.

In single detector configurations, the single detector may be configured to receive the output corresponding to the first polarized beam path and to subsequently receive the output corresponding to the second polarized beam path. Accordingly, a second delay line may be used to delay the output from the second polarized beam path, relative to the pathlength of the first polarized beam path. In some embodiments, a polarized beam splitter may be used to combine the first polarized beam path and the delayed second beam path before the beam paths arrive at the detector. In some embodiments, other configurations for combining the first polarized beam path and the delayed second beam path may be used, as aspects of the technology described herein are not limited in this respect. In some embodiments, the second delay line may be configured to have the same or approximately the same delay time as the first delay line. In some embodiments, the second delay line may be implemented using the techniques described above in connection with the first delay line. For example, the second delay line may be implemented using an optical fiber having a length corresponding to the temporal bandwidth, jitter amount of the detector, the deadtime of the detector, or a combination thereof.

In two detector configurations, a first detector is configured to receive the output of the first polarized beam path and a second detector is configured to receive the output of the second polarized beam path. In some embodiments, the first detector and the second detector are a same type of detector. In some embodiments, the first detector and the second detector are manufactured as paired detectors having approximately the same performance.

In some embodiments, regardless of the number of detectors used, the detector may be a superconducting nanowire single photon detector, as described herein. In some embodiments, any suitable non-polarization-agnostic single photon detector may be used.

Next, process 300 continues to act 312 by splitting the second shared beam path, using the polarizing beam splitter, in to the first polarized beam path and the second polarized beam path, in accordance with some embodiments of the technology described herein. In some embodiments, the delayed second shared beam path may be recombined with the first shared beam path prior to the polarizing beam splitter described above in connection with act 306, such that the second shared beam path may use the same input of the polarizing beam splitter as the first shared beam path. In some embodiments, the second shared beam path outputs light to a second input face of the polarizing beam splitter described above in connection with act 306. The second shared beam path is split, as described above with reference to the first shared beam path, such that light having a first polarization will be directed to a first output while light having a second polarization will be directed to a second output, the second polarization being orthogonal to the first polarization.

Next, process 300 continues to act 314 by detecting second outputs corresponding to the first polarized beam path and the second polarized beam path, in accordance with some embodiments of the technology described herein. The second outputs corresponding to the first polarized beam path and the second polarized beam path may be detected using a single detector or two detectors, as described herein in connection with act 310. Detecting the output corresponding to the first polarized beam path detects a third polarization measurement. Similarly, detecting the output corresponding to the second polarized beam path detects a fourth polarization measurement. In some instances, the measurement may be that no photons are detected. In some instances, the measurement may be that one photon is detected. In some embodiments, the measurement may be limited to single photon detection. In some embodiments, the measurement may detect zero, one, or more photons.

Following act 314, process 300 concludes. In single detector configurations, an additional act of determining the polarization of the respective polarization measurements is included. Unlike in the two-detector configuration where respective detectors may correspond to particular polarizations, in the single photon configuration, the same detector is used to detect each of the four polarization measurements. Accordingly, the first detection may be identified as corresponding to the first polarization measurement, the second detection may be identified as corresponding to the second polarization measurement, the third detection may be identified as corresponding to the third polarization measurement, and the fourth detection may correspond to the fourth polarization measurement. Therefore, by knowing the pathlengths and the corresponding delays, the polarization corresponding to each measurement may be determined based on the polarization having the shortest pathlength arriving first and the polarization having the longest pathlength arriving last.

In some embodiments, waveplates may be used to adjust the phase of a beam path between optical elements. For example, a waveplate may be used to change the polarization of the beam path to reduce the likelihood of early/late photons overlapping on a detector, as described herein. In some embodiments, waveplates may be used to compensate for phase delay acquired from optics used in the beam path.

Following the conclusion of process 300, a correlation between the first photon and the second photon may be determined based on the first polarization measurement, second polarization measurement, third polarization measurement, and the fourth polarization measurement. In some embodiments, process 300 may be used to execute a BB84 measurement. An example of a BB84 measurement is described in C. Lee, I. Sohn and W. Lee, "Eavesdropping Detection in BB84 Quantum Key Distribution Protocols," IEEE Transactions on Network and Service Management, vol. 19, no. 3, pp. 2689-2701 (2022), which is hereby incorporated by reference herein in its entirety. In some embodiments, process 300 may be used to execute an Ekart91 measurement. An example of a Ekart91 measurement is described in Yin, J., Li, Y H., Liao, S K. et al. "Entanglement-based secure quantum cryptography over 1,120 kilometres," Nature 582, 501-505 (2020), which is hereby incorporated by reference herein in its entirety. In some embodiments, process 300 may be used to execute an MDI-QKD measurement. An example of an MKI-QKD measurement is described in Lo, H. K., Curty, M., and Qi, B., "Measurement Device Independent Quantum Key Distribution," Phys. Rev. Lett., vol. 108, no. 13, pp. 120503-120508 (2012). In some embodiments, process 300 may be used for any non-entangled quantum protocol that relies on a two-photon measurement and/or randomized qubit measurements, as aspects of the technologies described herein are not limited in this respect.

Figure 4:
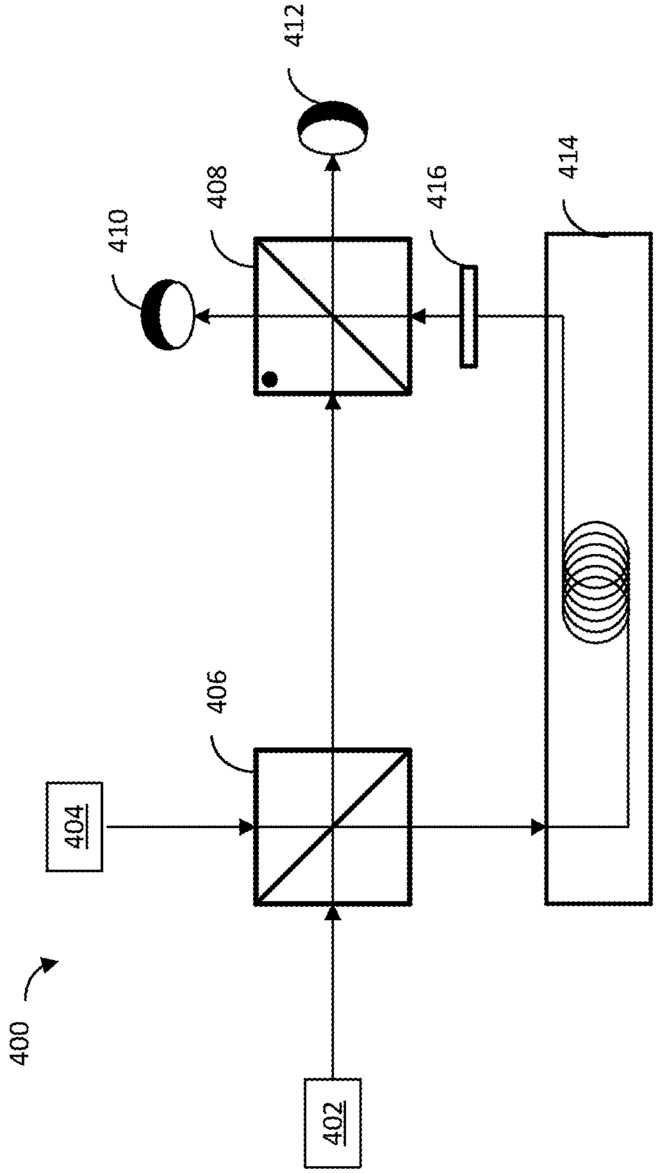
FIG. 4 illustrates an example of a system 400 for detecting correlations between photons using two detectors, in accordance with some embodiments of the technology described herein.

FIG. 4 illustrates an example of a system 400 for detecting correlations between photons using two detectors, in accordance with some embodiments of the technology described herein. System 400 includes nonpolarizing beamsplitter 406, polarizing beamsplitter 408, first detector 410, second detector 412, delay line 414, and waveplate 416.

Nonpolarizing beamsplitter 406 receives a first photon from a first beam path associated with entanglement source 402 and a second photon from a second beam path associated with second entanglement source 404. Nonpolarizing beamsplitter 406 probabilistically splits the first beam path and the second beam path between the two outputs of nonpolarizing beam splitter 406. Accordingly, a first output from nonpolarizing beam splitter 406 is received by polarizing beamsplitter 408 at a first input side. Polarizing beamsplitter 408 directs the received light either to detector 410 or detector 412 depending on the polarization of the received light. For example, horizontally polarized light may be transmitted to detector 412 while vertically polarized light may be transmitted to detector 410.

Furthermore, a second output from nonpolarizing beam splitter 406 is received by delay line 414. Delay line 414 adds a temporal delay to the light received from the second output, relative to the light which is transmitted to the detectors from the beam path. In some embodiments, delay line 414 is an optical fiber which may be coiled, as shown in FIG. 4, to increase pathlength within a small device volume.

Delay line 414 outputs delayed light to a second input of polarizing beamsplitter 408. Polarizing beamsplitter 408 directs the received light either to detection 410 or detector 412 depending on the polarization of the received light, as described herein. In some embodiments, a polarizer 416 is included between delay line 414 and polarizing beam splitter 408. Polarizer 416 may be used to compensate for phase drift occurring due to the delay line, and/or to reduce the odds of early/late photons being coincident on the same detector, as described herein.

In some embodiments, system 400 may be a sub-configuration of a larger system for detecting correlations between photons. The system may include two additional detectors for detecting and analyzing each additional pair of qubits received from separate entanglement sources. For example, multiple correlations detecting system, each having a configuration such as the configuration shown in FIG. 4 may be included with the correlation detecting system. Accordingly, additional photon (e.g., additional qubits) may be received from other entanglement sources to be processed by the additional detectors. For example, a respective additional nonpolarizing beamsplitter, delay line, and polarizing beamsplitter, may be included such that the additional detectors are configured to detect correlations between a third photon, from a third entanglement source, and a fourth photon, from a fourth entanglement source.

Figure 5:
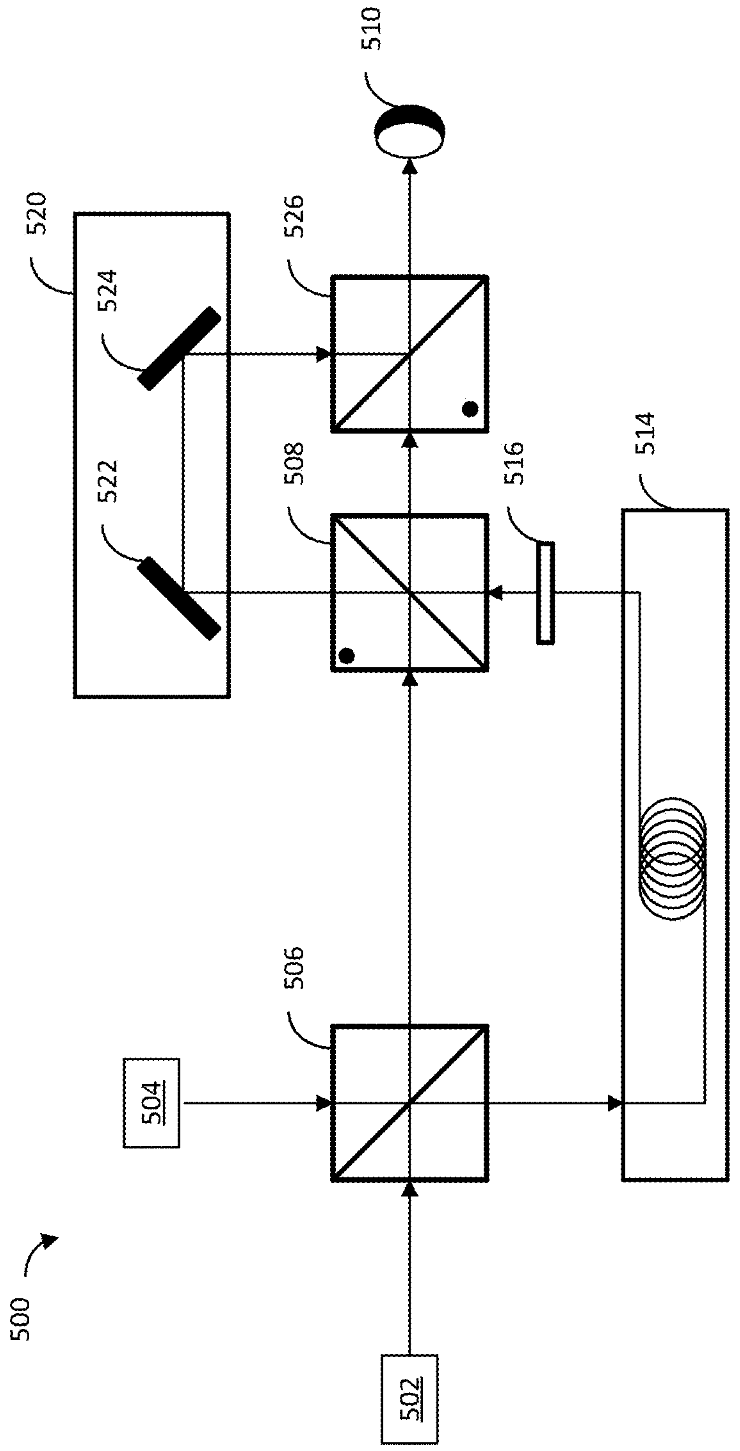
FIG. 5 illustrates an example of a system 500 for detecting correlations between photons using one detector, in accordance with some embodiments of the technology described herein.

FIG. 5 illustrates an example of a system 500 for detecting correlations between photons using one detector, in accordance with some embodiments of the technology described herein. System 500 includes nonpolarizing beamsplitter 506, first polarizing beamsplitter 508, first detector 510, first delay line 514, waveplate 516, second delay line 520, and second polarizing beam splitter 526. The nonpolarizing beamsplitter 506, first polarizing beamsplitter 508 delay line 514 and waveplate 516 may be configured in the same way as the corresponding components in system 400, shown in FIG. 4. Nonpolarizing beamsplitter 506 receives a first photon from a first beam path associated with entanglement source 502 and a second photon from a second beam path associated with second entanglement source 504. The first output of nonpolarizing beamsplitter 506 is directly received by polarizing beamsplitter 508 at a first input. The second output of nonpolarizing beamsplitter 506 is delayed by delay line 514 before being received at a second input of polarizing beam splitter 508.

A first output of polarizing beamsplitter 508 is sent to second delay line 520. Following delay line 520, the first output of polarizing beamsplitter 508 is combined with the beam path of the second output of polarizing beamsplitter 508. A second polarizing beam splitter 526 may be used to combine the first output of polarizing beamsplitter 508 with the beam path of the second output of polarizing beamsplitter 508. Accordingly, the second output of polarizing beamsplitter 508 will arrive at detector 510 and subsequently, following the delay introduced by delay line 520, the first output of polarizing beamsplitter 508 will arrive at detector 510.

In some embodiments, delay line 520 may include free space optics such as mirror 522 and mirror 524. Mirror 522 and mirror 524 are arranged at 45 degree angles relative to the beam path of the first output of polarizing beamsplitter 508. Additionally, mirror 522 and mirror 524 are placed a distance away from polarizing beamsplitter 508 and placed apart from each other such as to provide additional path length corresponding to a delay time to the first output of polarizing beamsplitter 508. In some embodiments, additional free space optical components may be included. Although shown as free space optics in the illustrated embodiments, in some embodiments, an optical fiber may be used, and/or a combination of free space optics and optical fiber components may be used.

In some embodiments, delay line 520 delays light by the delay time, where the delay time is a combination of one or more of the temporal bandwidth, jitter amount of the detector, and the deadtime of the detector. In some embodiments, delay line 514 delays light a duration larger than the delay time of delay line 520. Any suitable delay time may be used such that photons transmitted through delay line 514 do not arrive at detector 510 before photons which were transmitted through delay line 520, but not through delay line 514. In some embodiments, delay line 514 may be twice the delay as delay line 520. For example, delay line 520 may correspond to the deadtime of detector 510 and delay line 514 may correspond to twice the deadtime of detector 510. In some embodiments, other delay line delays may be used as aspects of the technology described herein are not limited in this respect.

Accordingly, for the photons received at nonpolarizing beam splitter 506, there are four time windows within which they may be received at detector 510. Photons which transmit from the first output of nonpolarizing beamsplitter 506 to polarizing beamsplitter 508, without passing through delay line 514 or delay line 520 after polarizing beamsplitter 508; photons which transmit from the first output of nonpolarizing beamsplitter 506 to polarizing beamsplitter 508, without passing through delay line 514 and then pass through delay line 520 after polarizing beamsplitter 508; photons which transmit from the second output of nonpolarizing beamsplitter 506 to polarizing beamsplitter 508 through delay line 514 but do not pass through delay line 520; and photons which transmit from the second output of nonpolarizing beamsplitter 506 to polarizing beamsplitter 508 through delay line 514 and then pass through delay line 520.

In some embodiments, system 500 may be a sub-configuration of a larger system for detecting correlations between photons. The system may include an additional detector for detecting and analyzing each additional pair of qubits received from separate entanglement sources. For example, multiple correlations detecting system, each having a configuration such as the configuration shown in FIG. 5 may be included with the correlation detecting system. Accordingly, additional photon (e.g., additional qubits) may be received from other entanglement sources to be processed by the additional detectors. For example, a respective additional nonpolarizing beamsplitter, delay line, and polarizing beamsplitter, may be included such that the additional detectors are configured to detect correlations between a third photon, from a third entanglement source, and a fourth photon, from a fourth entanglement source.

Having thus described several aspects of at least one embodiment, it is to be appreciated that various alterations, modifications, and improvements will readily occur to those skilled in the art. Such alterations, modifications, and improvements are intended to be part of this disclosure and are intended to be within the spirit and scope of the principles described herein. Accordingly, the foregoing description and drawings are by way of example only.

The phrase "and/or," as used herein in the specification and in the claims, should be understood to mean "either or both," of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

The indefinite articles "a" and "an," as used herein in the specification and in the claims, unless clearly indicated to the contrary, should be understood to mean "at least one."

As used herein in the specification and in the claims, the phrase, "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently, "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The terms "substantially," "approximately," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

All definitions, as defined and used herein, should be understood to control over dictionary definitions, definitions in documents incorporated by reference, and/or ordinary meanings of the defined terms.

The invention claimed is:

1. A system for detecting correlations between two photons, the system comprising:

- a non-polarizing beam splitter configured to receive a first photon from a first entanglement source at a first input of the non-polarizing beam splitter and to receive a second photon from a second entanglement source at a second input of the non-polarizing beam splitter;
- a polarizing beam splitter having a first input and a second input, the polarizing beam splitter configured to receive a first output of the non-polarizing beam splitter at the first input of the polarizing beam splitter, the polarizing beam splitter configured to direct light having a first polarization to a first output of the polarizing beam splitter and to direct light having a second polarization to a second output of the polarizing beam splitter;
- a delay line configured to receive a second output of the non-polarizing beam splitter and to output light to the second input of the polarizing beam splitter;
- a first photon detector configured to receive the output corresponding to the first polarization; and
- a second photon detector configured to receive the output corresponding to the second polarization.

2. The system of claim 1, wherein the delay line has a length corresponding to a time delay greater than or equal to a temporal bandwidth of the first and second photon or a jitter of a detector.

3. The system of claim 2, wherein the delay line provides a delay between 20 and 40 ns.

4. The system of claim 3 wherein the delay line is a fiber optic cable.

5. The system of claim 1, wherein the non-polarizing beam splitter is a non-polarizing beam splitter cube.

6. The system of claim 1, wherein the polarizing beam splitter is a Glan-Taylor prism polarizer.

7. The system of claim 1, where the first detector and the second detector are a same kind of detector.

8. The system of claim 7, wherein the same kind of detector is a superconducting nanowire single photon detector.

9. The system of claim 1, wherein the first photon detector and the second photon detector are configured to detect four Bell parameters, based on four polarization measurements, a first two polarization measurements being detected based on the first output of the non-polarizing beam splitter and a second two polarization measurements being detected based on the second output of the non-polarizing beam splitter.

10. The system of claim 1, further comprising additional detectors, with a respective nonpolarizing beamsplitter, delay line, and polarizing beamsplitter, the additional detectors being configured to detect correlations between a third photon, from a third entanglement source, and a fourth photon, from a fourth entanglement source.

11. A system for detecting correlations between two photons, the system comprising:

- a non-polarizing beam splitter configured to receive a first photon from a first entanglement source at a first input of the non-polarizing beam splitter and to receive a second photon from a second entanglement source at a second input of the non-polarizing beam splitter;
- a polarizing beam splitter having a first input and a second input, the polarizing beam splitter configured to receive a first output of the non-polarizing beam splitter at the first input of the polarizing beam splitter, the polarizing beam splitter configured to direct light having a first polarization to a first output of the polarizing beam splitter and to direct light having a second polarization to a second output of the polarizing beam splitter;
- a first delay line configured to receive a second output of the non-polarizing beam splitter and to output light to the second input of the polarizing beam splitter;
- a second delay line configured to receive the second output of the polarizing beam splitter having the second polarization and to output the received second output into a shared beam path, the shared beam path configured to receive the first output of the polarizing beam splitter and an output of the second delay line; and
- a photon detector configured to receive photons at different times depending on their path between the non-polarizing beam splitter and the photon detector.

12. The system of claim 11, wherein the first delay line has a longer optical pathlength than the second delay line.

13. The system of claim 12, wherein the second delay line has an optical pathlength approximately equal to a temporal bandwidth of the first and second photon and the first delay line has an optical pathlength approximately equal to twice the temporal bandwidth of the first and the second photon.

14. The system of claim 11, wherein the first photon detector is a superconducting nanowire single photon detector.

15. The system of claim 11, wherein the first photon detector is configured to detect four bell parameters, based on four polarization measurements, the four polarization measurements comprising:

- a first polarization measurements being detected based on the first output of the non-polarizing beam splitter;
- a second polarization measurement being detected based on the first output of the non-polarizing beam splitter and the second delay line;
- a third polarization measurement being detected based on the second output of the non-polarizing beam splitter and the first delay line; and a fourth polarization measurement being detected based on the second output of the non-polarizing beam splitter, the first delay line, and the second delay line.

16. A method for detecting a quantum state based on detection of two photons, the method comprising:

receiving a first photon, from a first beam path, and a second photon, from a second beam path;

splitting the first beam path and the second beam path into a first shared beam path and a second shared beam path;

splitting the first shared beam path, using a polarizing beam splitter, into a first polarized beam path and a second polarized beam path, the second polarized beam path having a polarization orthogonal to the first polarized beam path;

delaying the second shared beam path;

detecting first outputs corresponding to the first polarized beam path and the second polarized beam path;

splitting the second shared beam path, using the polarizing beam splitter, into the first polarized beam path and the second polarized beam path; and detecting second outputs corresponding to the first polarized beam path and the second polarized beam path.

17. The method of claim 16, wherein delaying the second shared beam path comprises using a delay line that has a length corresponding to a time delay greater than or equal to a temporal bandwidth of the first and second photon or a jitter of a detector.

18. The method of claim 17, wherein the delay line provides a delay between 20 and 40 ns.

19. The method of claim 16, wherein detecting first outputs corresponding to the first polarized beam path comprises using a first detector and detecting first outputs corresponding to the second polarized beam path comprises using a second detector.

20. The method of claim 16, wherein detecting first outputs corresponding to the first polarized beam path comprises using a first detector and detecting first outputs corresponding to the second polarized beam path comprises delaying the second polarized beam path and using the first detector.

* * * * *